United States Patent
Kwon et al.

(10) Patent No.: US 8,135,063 B2
(45) Date of Patent: Mar. 13, 2012

(54) RATE CONTROL METHOD WITH FRAME-LAYER BIT ALLOCATION AND VIDEO ENCODER

(75) Inventors: Do Kyoung Kwon, Kyunggi (KR); Meiyin Shen, Kaonsiung (TW); Chung-Chieh Kuo, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1587 days.

(21) Appl. No.: 11/530,042

(22) Filed: Sep. 8, 2006

(65) Prior Publication Data

US 2008/0063051 A1    Mar. 13, 2008

(51) Int. Cl.
*H04N 7/12*    (2006.01)

(52) U.S. Cl. .............................. 375/240.03; 375/240.05

(58) Field of Classification Search ........................ None
See application file for complete search history.

(56) References Cited

U.S. PATENT DOCUMENTS

| | | | |
|---|---|---|---|
| 5,758,092 A * | 5/1998 | Agarwal | 709/247 |
| 6,366,704 B1 | 4/2002 | Ribas-Corbera et al. | |
| 7,751,478 B2 * | 7/2010 | Kim et al. | 375/240.12 |
| 2003/0202580 A1 | 10/2003 | Noh et al. | |
| 2005/0058199 A1 * | 3/2005 | Zhao et al. | 375/240.03 |
| 2005/0157784 A1 * | 7/2005 | Tanizawa et al. | 375/240.03 |
| 2006/0039473 A1 * | 2/2006 | Filippini et al. | 375/240.16 |
| 2008/0144723 A1 * | 6/2008 | Chen et al. | 375/240.26 |
| 2008/0298464 A1 * | 12/2008 | Hinz et al. | 375/240.24 |
| 2010/0329333 A1 * | 12/2010 | Haskell et al. | 375/240.03 |

* cited by examiner

*Primary Examiner* — Joseph Ustaris
*Assistant Examiner* — Frederick Bailey
(74) *Attorney, Agent, or Firm* — Thomas|Kayden

(57) ABSTRACT

A video encoder controlling rate of each frame in a current frame set (Group of Picture, GOP), and method thereof. The video encoder comprises a frame grouping device, a GOP initialization device, and a GOP encoding device. The frame grouping device allocates a target bit budget $R_{GOP}$ to the current frame set. The GOP initialization device is coupled to the frame grouping device, and estimates a first quantization parameter $QP_1$ based on the target bit budget $R_{GOP}$ and complexity of the current frame set. The GOP encoding device is coupled to the GOP initialization device, and encoding a frame in the current frame set with the second quantization parameter $QP_2$ to generate output data.

28 Claims, 14 Drawing Sheets

RATE CONTROL METHOD WITH FRAME-LAYER BIT ALLOCATION AND VIDEO ENCODER

BACKGROUND OF THE INVENTION

1. Field of the Invention

The invention relates to video encoding, and in particular to video coding rate control with frame-layer bit allocation.

2. Description of the Related Art

Block-based video coding standards such as MPEG-1/2/4 and H.26x play an important role in the development of video systems, including real-time video coding applications such as video conferencing and offline video coding applications such as video streaming and video in storage medium. In video systems, rate control is very important in that it not only regulates the compressed bit stream but also improves the compressed video quality under various channel and buffer constraints by allocating bits to each coding unit in a rate-distortion (R-D) optimized sense. Different coding units such as macroblock (MB), group of macroblock (GOB) and frame can be used for quality optimization. However, frame-based optimization is most popular and effective, by which target bits are assigned to each frame such that overall distortion is minimized while imposed constraints are satisfied.

Bit allocation methods in video systems deploy a model-based analytical approach or an operational rate and distortion (R-D) based approach to allocate the target bits to each frame in the GOP. The model-based analytical approach utilizes rate and distortion models to estimate R-D characteristics of frames at admissible quantization parameters. The operational R-D based method encodes the frame with a finite set of admissible quantization parameters to obtain corresponding rates and distortions, and determines an optimal quantization parameter according to the actual rates and the actual distortions thereof.

Bit allocation methods can be classified into one-pass and multi-pass ones according to the number of encoding passes of video data. In multi-pass methods, the frames in a GOP are encoded through multiple encoding passes to collect R-D characteristics at different quantization parameters. Multi-pass methods are used for offline video coding applications where encoding delay is not of a concern such as video streaming and video in storage medium. In one-pass methods, R-D characteristics of a set of frames (i.e., GQP) are usually estimated from those of a previous set. One-pass methods are used for real-time encoding applications, where future frames are not available and long encoding delay is not permitted. Even in offline video coding application, one-pass method can be used to reduce encoding complexity.

Two-pass methods, which are kind of multi-pass methods, were disclosed by Y. Yun, J. Zhou, Y. Wang, and C. W. Chen in "A novel two-pass VBR coding algorithm for fixed size storage applications," *IEEE Trans. Circuits and Syst. Video Technol.*, pp. 345-356, March 2001, and J. Cai, Z. He, C. W. Chen in "Optimal bit allocation for low bit rate video streaming applications," *Proc. IEEE Intl. Conference. Image Processing*, pp. 1-73-1-76, May 2004. In the two pass methods, R-D characteristics are collected in the first pass, and frames are finally encoded in the second pass based on the collected R-D characteristics in the first pass. Both two-pass methods determine the optimal number of frame bits assuming that frame is independent of each other.

Exemplary one-pass methods include "A frame-layer bit allocation for H.264+," *IEEE Trans. Circuits and Syst. Video Technol.*, pp. 1154-1158, October 2000, and "Rate control for an embedded wavelet video coder," *IEEE Trans. Circuits and Syst. Video Technol.*, vol. 7, pp. 696-702, August 1997. In both exemplary one-path methods, characteristics such as frame energies and/or rate and distortion model parameters of the frames in the current GOP are estimated from those of the previous GOP. For the reason, robustness of these algorithms to various types of sequences cannot be guaranteed.

A need exists for a method and a device for effective rate control with frame-layer bit allocation such that an output bit stream is compatible with the channel bit rate with improved video quality.

BRIEF SUMMARY OF THE INVENTION

A detailed description is given in the following embodiments with reference to the accompanying drawings.

According to the invention, a video encoder controlling rate of each frame in a current frame set (Group of Picture, GOP) is provided, comprising a frame grouping device, a GOP initialization device, and a GOP encoding device. The frame grouping device allocates a target bit budget $R_{GOP}$ to the current frame set. The GOP initialization device is coupled to the frame grouping device, and estimates a first quantization parameter $QP_1$ based on $R_{GOP}$ and the complexity of the current frame set. The GOP encoding device is coupled to the GOP initialization device, and encodes a frame in the current frame set with a second quantization parameter $QP_2$ to generate an encoded bit stream.

According to another embodiment of the invention, a method of rate control for each frame of a current frame set in a video encoder comprises allocating a target bit budget $R_{GOP}$ to the current frame set, estimating a first quantization parameter $QP_1$ based on $R_{GOP}$ and complexity of the current frame set, and encoding a frame in the current frame set with a second quantization parameter $QP_2$ to generate output data.

According to another embodiment of the invention, a method of rate control for each frame in a current frame set comprises allocating a target bit budget $R_{GOP}$ to the current frame set, analyzing a frame in the current frame set by encoding with an average quantization parameter $QP_{avg}$ of a previous frame set to obtain a rate model and a distortion model of the frame, determining a first quantization parameter of the frame based on the target number of bits, the rate model and the distortion model using Lagrange optimization technique, and encoding the frame with a second quantization parameter $QP_2$ to generate output data.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
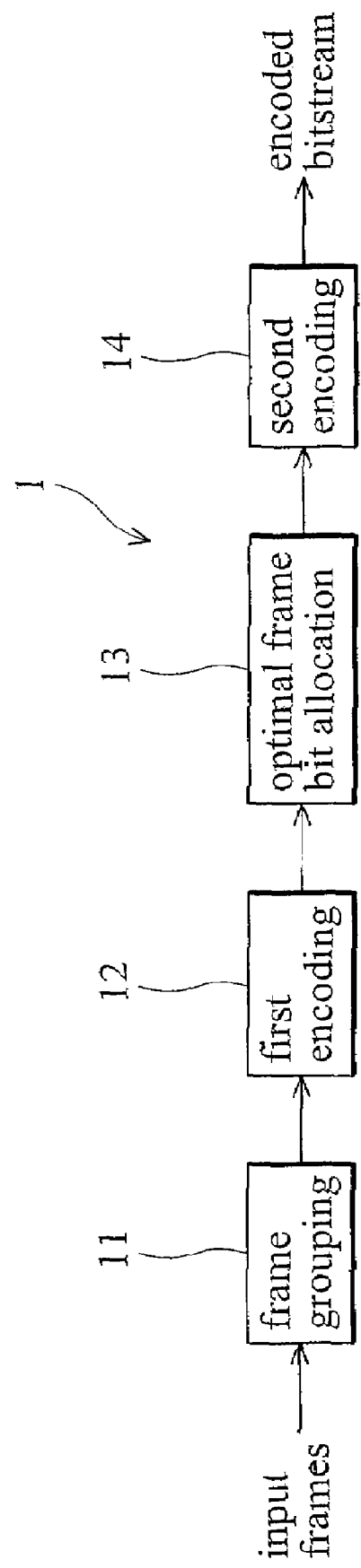
FIG. 1 is a block diagram of an exemplary encoding system with a two-pass rate controller of the invention.

The following description is of the best-contemplated mode of carrying out the invention. This description is made for the purpose of illustrating the general principles of the invention and should not be taken in a limiting sense. The scope of the invention is best determined by reference to the appended claims.

In most offline video coding applications, constant bit rate (CBR) channel is used to deliver compressed bit streams, and encoder and decoder buffers are employed to absorb the bit rate variations. A rate control algorithm ensures the encoder and decoder buffers do not underflow or underflow. The disclosure is applicable to the compressed bit streams delivered over CBR channel with the constraints comprising the channel bit rate and the encoder buffer size. The video coding unit in the invention is a Group of Picture (GOP) including a known frame sequence of intra (I-frame), prediction (P-frame), or bidirectional (B-frame) frames. An I-frame is usually the first frame of a GOP, and is encoded without motion compensation, as a normal image. A P-frame is predicted from the I-frame or P-frame that is immediately preceding it. A B-frame is predicted bidirectionally from preceding and successive I-frames or P-frames. As an embodiment, the invention deploys a GOP with first frame thereof being I frame and other frames thereof being P frames. Those skilled in the art will readily observe that modifications and alterations of the proposed inventions for different GOP structures.

Quantization parameter (QP) regulates spatial detail of an image frame to be saved. Small QP retains high image quality at the cost of frame data size, large QP causes lower image quality with less frame data size. Given a target number of bits for a GOP $R_{GOP}$, a first quantization parameter (QP) $QP_1$ is used for the R-D optimized motion estimation and mode decision (RDO) in the first encoding step and then a second quantization parameter $QP_2$, obtained from frame-layer rate and distortion models, is used for actual encoding of the residual signal in the second encoding step. For this purpose, a rate model $R_i(QP)$ including header $R_{hdr}$ and texture $R_{txt}$ (QP) models and a distortion model $D_i(QP)$ are provided. The rate model $R_i(QP)$ models rate of a frame as a function of quantization parameter QP, and the distortion model $D_i(QP)$ models distortion thereof as a function of quantization parameter QP.

The optimal frame bit allocation problem can be formulated as follows:

$$\text{minimize} \sum_{i=1}^{N_{GOP}} D_i(QP_1, \ldots, QP_i) \quad [1]$$

subject to $$\sum_{i=1}^{N_{GOP}} R_i(QP_1, \ldots, QP_i) \leq R_{GOP},$$

where $QP_i$ is a quantization parameter of the $i^{th}$ frame,
$R_i(QP_i)$ is rate of the $i^{th}$ frame,
$D_i(QP_i)$ is distortion of the $i^{th}$ frame,
$N_{GOP}$ is a number of frames in a GOP,
$R_{GOP}$ is a target number of bits of the GOP.

The rate and distortion of one frame depend on the selection of quantization parameter QP of the previous frames due to dependencies between frames. In order to make the problem more tractable, the optimal frame bit allocation problem can be formulated assuming independencies between frames as follows:

$$\text{minimize} \sum_{i=1}^{N_{GOP}} D_i(QP_i) \quad [2]$$

subject to $$\sum_{i=1}^{N_{GOP}} R_i(QP_i) \leq R_{GOP}.$$

This constrained problem in Formula 2 can be solved using the Lagrange optimization technique. It transforms the constrained problem into a series of unconstrained problems with a Lagrange multiplier parameter $\lambda$, as shown below:

$$J = \text{minimize} \sum_{i=1}^{N_{GOP}} D_i(QP_i) + \lambda \cdot \sum_{i=1}^{N_{GOP}} R_i(QP_i), \quad [3]$$

for a $\lambda$ that satisfies the following target bit budget constraint for a GOP, i.e., $$R_{GOP} = \sum_{i=1}^{N_{GOP}} R_i(QP_i).$$

In the invention, the optimal frame bit allocation is based on Equation 3 with slight modification. Two-pass and one-pass frame bit allocation methods and systems are disclosed.

FIG. 1 is a block diagram of an exemplary encoding system with a two-pass rate controller of the invention. Encoding system 1 comprises a frame grouping device 11, a first-pass encoding device 12, an optimal frame bit allocation device 13, and a second-pass encoding device 14. The frame grouping device 11 is coupled to the first-pass encoding device 12, the optimal frame bit allocation device 13, and subsequently to the second-pass encoding device 14.

The frame grouping device 11 receives and groups frames into a Group of Picture (GOP), and allocates target GOP bits among them. The first-pass encoding device 12 encodes all frames in the GOP using average quantization parameter $QP_{avg}$ of the previous GOP. The optimal frame bit allocation device 13 receives the encoded frames from the first-pass encoding device 12 to determine optimal number of bits for each frame by Lagrange optimization technique. Finally all frames in the GOP are encoded again based on a two-step encoding scheme in the second-pass encoding device 14.

In the frame grouping device 11, a target number of GOP bits $R_{GOP}$ is determined as follows:

$$R_{GOP} = \frac{C \cdot N_{GOP}}{f} + \varepsilon \quad [4]$$

where f is a frame rate of the GOP, C is a channel rate in bps, $N_{GOP}$ is a number of frames in the GOP, and $\epsilon$ is a feedback term from the previous GOP representing difference between target number of GOP bits $R_{GOP}$ and a number of actual GOP bits of the previous GOP.

Figure 2:
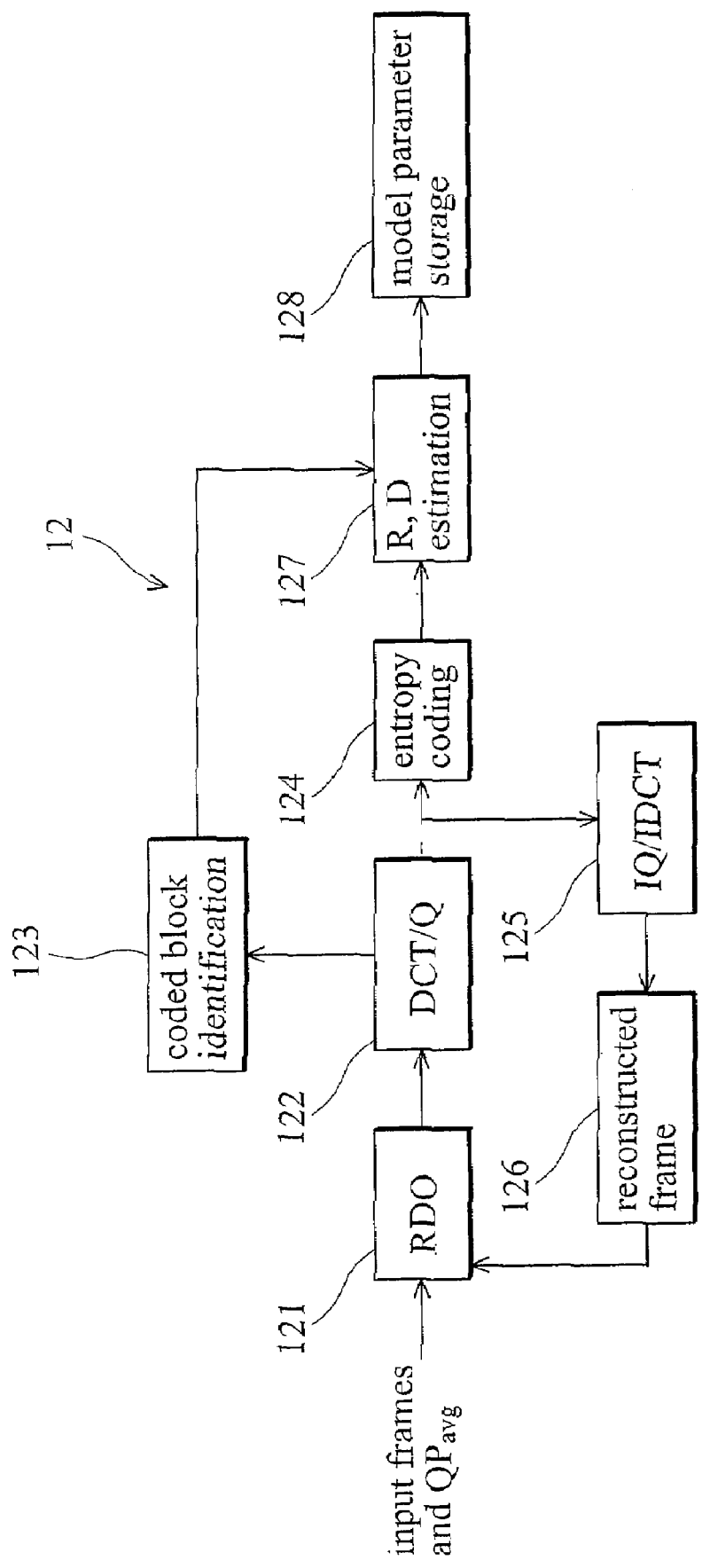
FIG. 2 is a block diagram of an exemplary first-pass encoding device 12 incorporated in FIG. 1.

FIG. 2 is a block diagram of an exemplary first-pass encoding device 12 incorporated in FIG. 1. The first-pass encoding device 12 comprises a rate-distortion optimization (RDO) unit 121, a discrete cosine transform (DCT) and quantization unit 122, a coded block identification unit 123, an entropy coding unit 124, an inverse quantization and DCT unit 125, a reconstructed frame storage unit 126, a rate and distortion estimation unit 127 and a model parameter storage unit 128. The RDO unit 121 is coupled to the quantization unit 122, in turns coupled to the coded block identification unit 123, the entropy coding unit 124, and the inverse quantization and DCT unit 125. The inverse quantization and DCT unit 125 is coupled to the reconstructed frame storage unit 126, then the RDO unit 121. The coded block identification unit 123 and the entropy coding unit 124 are coupled to the rate and distortion estimation unit 127, and subsequently to the model parameter storage unit 128.

In the RDO unit 121, each macroblock (MB) in the frames of the GOP undergoes the R-D optimized motion estimation and mode decision using average quantization parameter $QP_{avg}$ of the previous GOP. Each MB is reconstructed for intra predictions of the successive MB and inter predictions of the subsequent frames via the DCT and quantization unit 122 and the inverse DCT and inverse quantization unit 125, and the reconstructed frame is stored in the reconstructed frame storage 126. The coded block identification unit 123 identifies coded 4×4 blocks for quantization parameter QP between $QP_{avg}-\Delta'$ and $QP_{avg}+\Delta'$, where $\Delta'$ is the quantization parameter range being considered. The entropy coding unit 124 performs entropy coding to the frame to produce rate $R_{txt}(QP_{avg})$ and distortion $D(QP_{avg})$, thereby determining model parameters $\alpha$ and $\beta$ in the following expressions:

$$R_{txt}(Qs) = \alpha \cdot \frac{SATD_C(Qs)}{Qs}, \quad [5]$$

$$D(Qs) = D_C(Qs) + D_S(Qs) = \beta \cdot SATD_C(Qs) \cdot Qs + D_S(Qs), \quad [6]$$

where $\alpha$ and $\beta$ are model parameters, and Qs is a quantization step size corresponding to quantization parameter QP.

The rate and distortion estimation unit 127 estimates rate $R_{txt}(QP)$ and distortion $D(QP)$ for quantization parameter QP between $QP_{avg}-\Delta'$ and $QP_{avg}+\Delta'$ using Formulae 5 and 6. The number of header bits $R_{hdr}$ can also be obtained in the entropy coding unit 124 based on the following expression:

$$R_{hdr} = R_{hdr,inter} + R_{hdr,intra} = \gamma \cdot (N_{nzMVe} + w \cdot N_{MV}) + N_{intra} \cdot b_{intra}, \quad [7]$$

where $\gamma$ is a model parameter,
$N_{intra}$ is the number of intra MBs,
$b_{intra}$ is the average number of header bits for intra MB, and
w is a constant coefficient, with values according to the number of reference frames in a GOP, given by:

$$w = \begin{cases} 0.5 & \text{if the number of reference frame} \geq 5, \\ 0.4 & \text{if the number of reference frame} \geq 3, \\ 0.3 & \text{otherwise.} \end{cases}$$

Even though the number of header bits $R_{hdr}$ depends on quantization parameter QP, it may be regarded as a constant value for a small range of quantization parameters QP. Summing texture bit $R_{txt}(QP)$ and header bit $R_{hdr}$ yields rate R(QP) for quantization parameters QP between $QP_{avg}-\Delta'$ and $QP_{avg}+\Delta'$. For each frame (the $i^{th}$ frame) in the GOP, corresponding model parameters $\alpha_i$, $\beta_i$, $\gamma_i$, and $b_{intra,\,i}$ are determined in the entropy coding unit 124 and the rate and distortion estimation unit 127, and stored in the model parameter storage unit 128 for uses in the second encoding pass.

Figure 3:
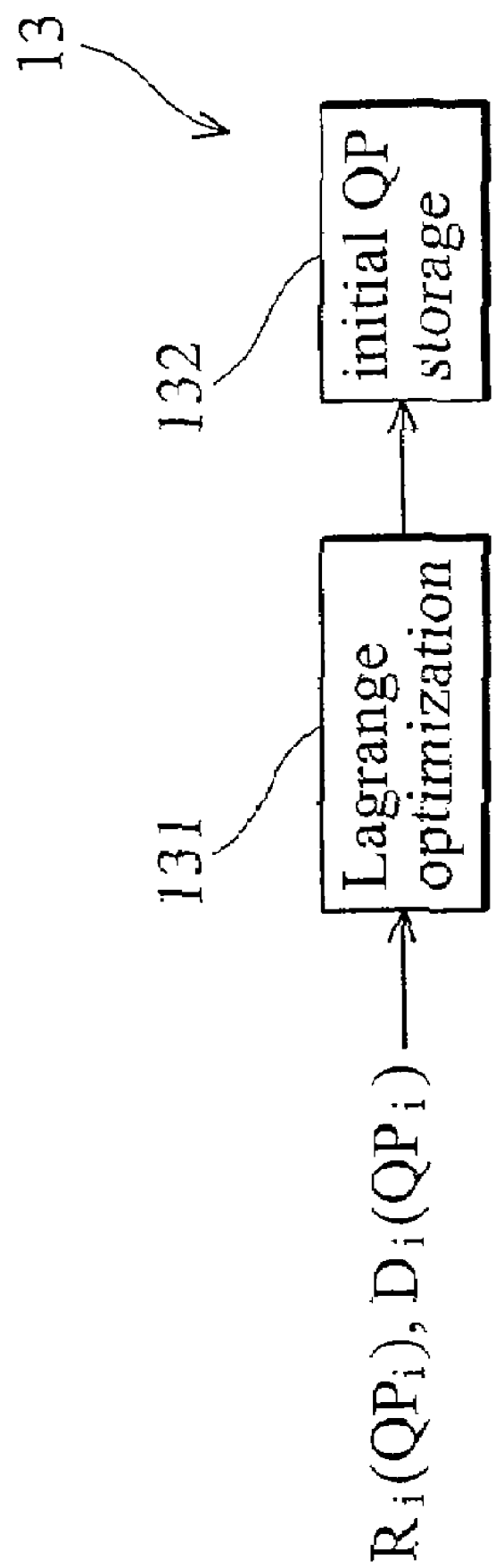
FIG. 3 is a block diagram of the optimal frame bit allocation device 13 incorporated in FIG. 1.

FIG. 3 illustrates a block diagram of the optimal frame bit allocation device 13 incorporated in FIG. 1. The optimal frame bit allocation device 13 comprises a Lagrange optimization unit 131 and an initial QP storage unit 132 coupled thereto.

In the Lagrange optimization unit 131, a set of optimal quantization parameters (second quantization parameters) $QP_i'$ that minimizes Lagrange cost in Formula 8 is determined using Lagrange optimization technique.

$$(QP_1', QP_2', \ldots, QP_{N_{GOP}}') = \quad [8]$$

$$\underset{QP_{avg}-\Delta' \leq QP_i \leq QP_{avg}+\Delta'}{\mathrm{argmin}} \sum_{i=1}^{N_{GOP}} \omega_i \cdot D_i(QP_i) + \lambda \cdot \sum_{i=1}^{N_{GOP}} R_i(QP_i),$$

where $\omega_i$'s are weighting factors to incorporate dependencies between frames by assigning large values to reference frames. Lagrange multiplier $\lambda$ is determined through iteration such that the total rate is equal to $R_{GOP}$, i.e.

$$R_{GOP} = \sum_{i=1}^{N_{GOP}} R_i(QP_i'). \quad [9]$$

Then the number of bits allocated to the $i^{th}$ frames is given by $R_i(QP_i')$. In one embodiment, $\omega_i$ of the first I frame is 1.2 and $\omega_i$'s of P frames are 1, and $\Delta'$ is 5. In the initial QP storage unit 132, a set of optimal quantization parameters $QP_i'$ by solving Equation 8 is stored so that optimal quantization parameter $QP_i'$ can be used as $QP_1$ in a second encoding step in the second-pass encoding device 14.

Figure 4:
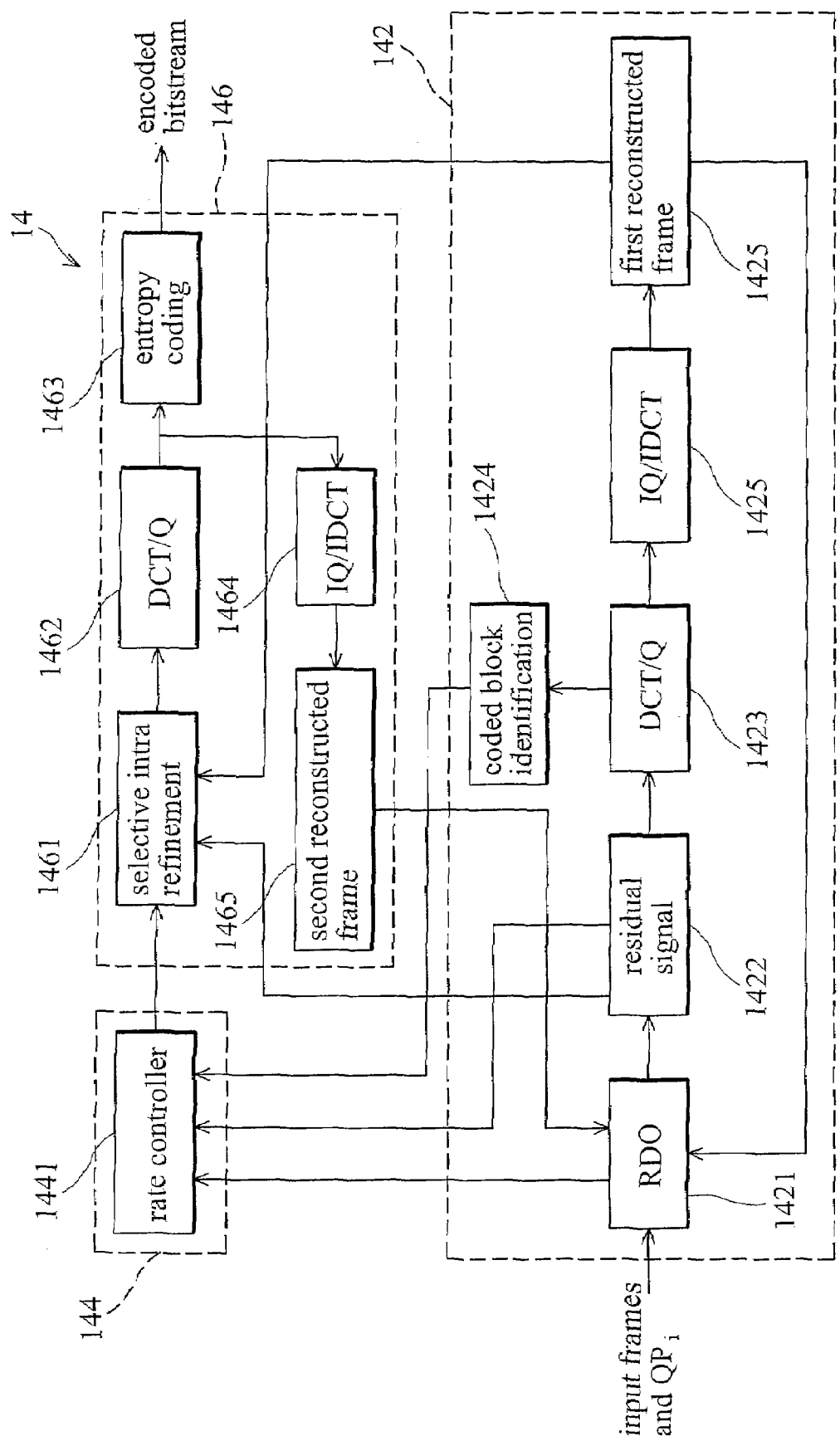
FIG. 4 is a block diagram of the second encoding pass device 14 in FIG. 1.

FIG. 4 shows a block diagram of the second-pass encoding device 14 incorporated in FIG. 1, comprising a first-step encoding device 142, a rate control device 144, and a second-step encoding device 146. The second-pass encoding device 14 performs a two-step encoding process based on the set of optimal quantization parameter $QP_i$ from the first-pass encoding in the first encoding pass device 12.

The first-step encoding device 142 comprises a RDO unit 1421, a residual signal storage unit 1422, a DCT and quantization unit 1423, a coded block identification unit 1424, an inverse DCT and quantization unit 1425, and a first reconstructed frame storage unit 1426. The RDO unit 1421 receives a frame and performs R-D optimized motion estimation and mode decision to all macroblocks (MB) thereof using optimal quantization parameter $QP_i$ determined in the optimal frame bit allocation device 13. The residual signal and the header information such as motion vectors (MV) and reference frames from the RDO unit 1421 are stored in the residual signal unit 1422. Each MB is reconstructed for intra predictions of the next MBs via the DCT and quantization unit 1423 and the inverse DCT and inverse quantization unit 1425, and the reconstructed frame is stored in the first reconstructed frame storage 1426. The coded block decision unit 1424 identifies the coded 4×4 blocks for MB quantization parameters $QP_2$ from $QP_i'-\Delta$ to $QP_i'+\Delta$, where $\Delta$ is the quantization parameter range being considered in the second-pass encoding and is 3 in the embodiment.

The rate control device 144 determines second quantization parameter $QP_2$ of each MB for the second step of the second-pass encoding, and comprises a rate controller unit 1441. The rate controller unit 1441 requires the model parameters, the header information such as MVs and reference frames, the residual signals and the coded 4×4 block information from the first-step encoding device 142 as input data.

The second-step encoding device 146 generates the output bitstream using second quantization parameter $QP_2$ determined in the rate control device 34. The second-step encoding device 146 comprises a selective intra refinement unit 1461, a DCT and quantization unit 1462, an entropy coding unit 1463, and an inverse DCT and quantization unit 1464, and a second reconstructed frame storage 1465. The selective intra refinement unit 1461 obtains the residual signal from the residual signal storage unit 1422, refines it using the intra mode determined in the first-step encoding device 142, and is activated when an MB mode is an intra prediction mode. The quantization unit 1362 performs quantization and the entropy coding unit 1463 encodes the frame using second quantization parameter $QP_2$ to generate the output bitstream. Finally, the frame is reconstructed again via the inverse DCT and quantization unit 1464, and the reconstructed frame is stored in the second reconstructed frame storage unit 1465 for intra predictions of the successive MBs in the frame and for inter predictions of the subsequent frames.

Figure 5:
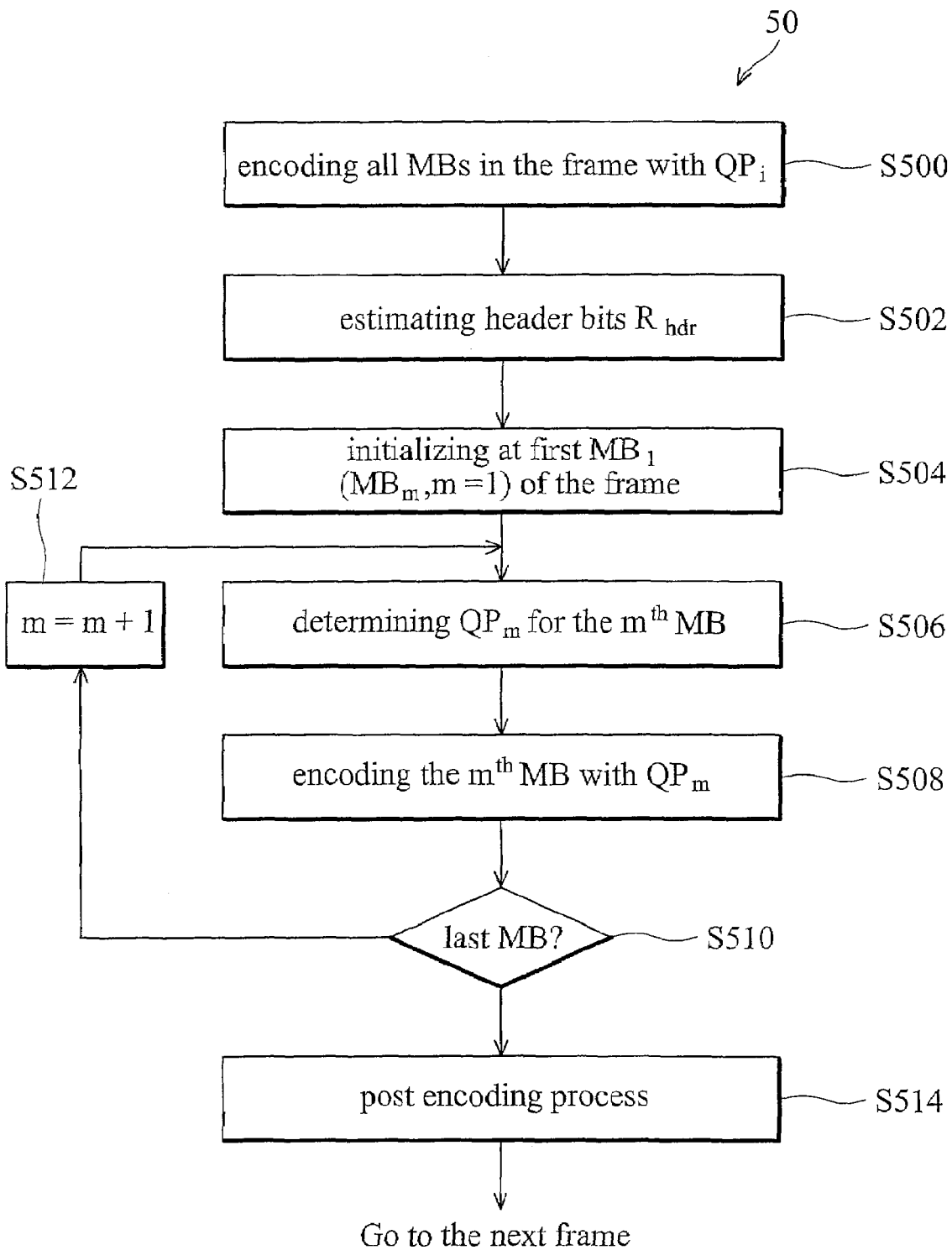
FIG. 5 is a flowchart of the frame encoding method in the second encoding pass device 14 in FIG. 1.

FIG. 5 is a flowchart of the frame encoding method in the second-pass encoding device 14 in FIG. 1. In step S500, all MBs of the input frame (the $i^{th}$ frame) are encoded using optimal quantization parameter $QP_i'$ to produce the residual signal and the header information. In step S502, the header bits $R_{hdr}$ of the frame is estimated using Equation 7 and the available texture bits $R_{txt}$ is derived from subtracting the header bits $R_{hdr}$ from the target number of frame bits $R_T$. Next, the second encoding pass method 5 initializes MB position $MB_m$ at the first MB of the $i^{th}$ frame in step S504, determines the MB quantization parameter $QP_2$ corresponding to $MB_m$ using model parameters, $\alpha_i$ and $\beta_i$, the residual signal, the header information, and the coded 4×4 blocks information in step S506, and encodes the $m^{th}$ $MB_m$ again with the MB quantization parameter $QP_2$ in step S508. In step S510, the method 5 determines if the MB position $MB_m$ is the last MB in the frame, executes step S512 if the MB position $MB_m$ has not yet reached the last MB, or updates the encoding buffer status in step S514 if the MB position $MB_m$ is the last MB. In step S512, the MB position $MB_m$ is incremented to the next MB, and the MB position $MB_{m+1}$ undergoes step S506, S508, and S510 again for the second encoding process, until the method 5 is completed for the last MB.

Figure 6:
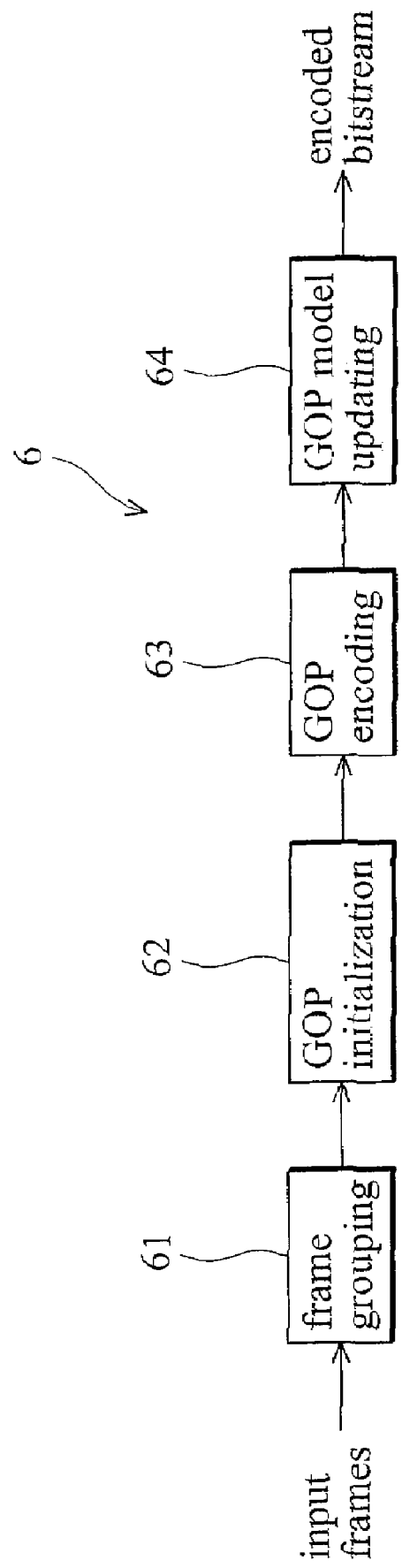
FIG. 6 is a block diagram of an exemplary encoding system with a one-pass rate controller of the invention.
Figure 7A:
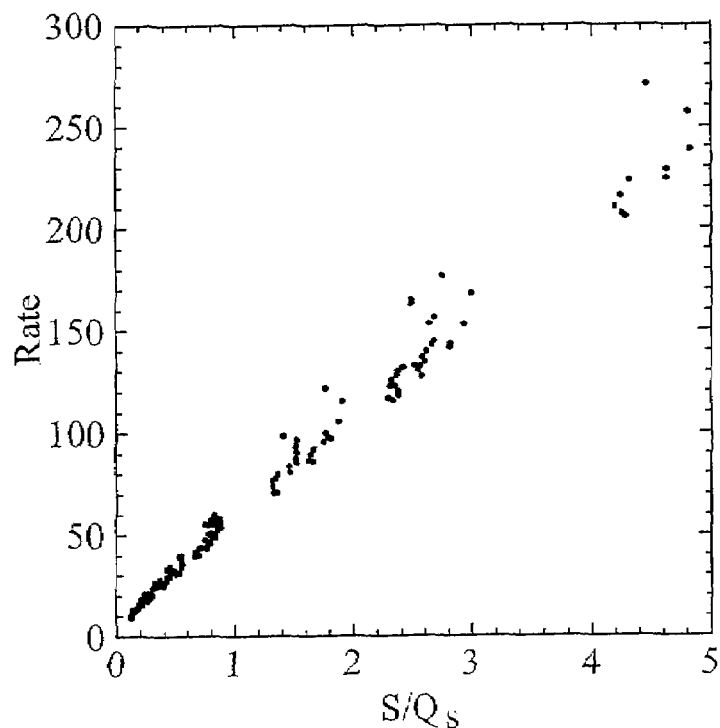
FIGS. 7a-7d show the relationship between $R_{GOP}$ and S/Qs for all combinations of quantization parameter $QP_1$ and Lagrange multiplier $\lambda$.
Figure 7B:
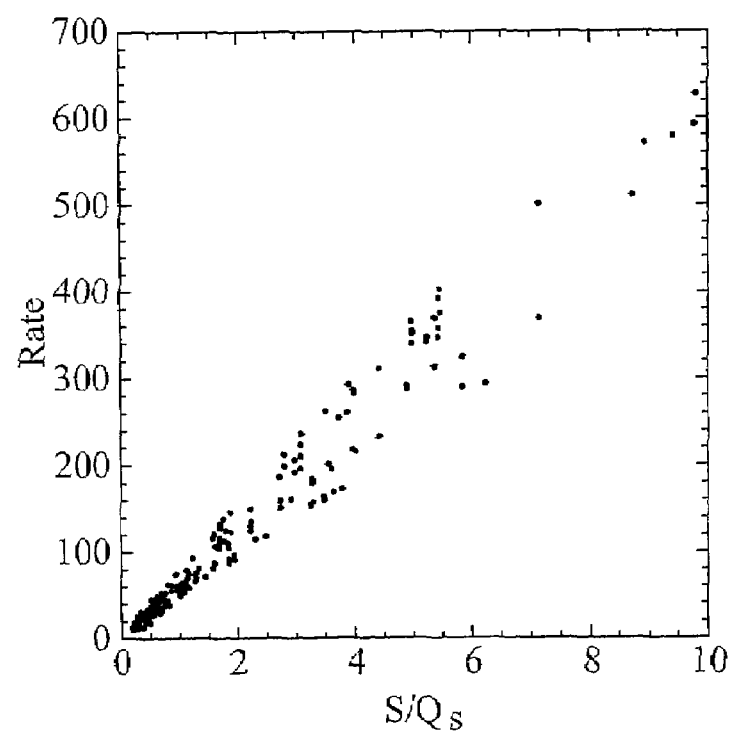
Figure 7C:
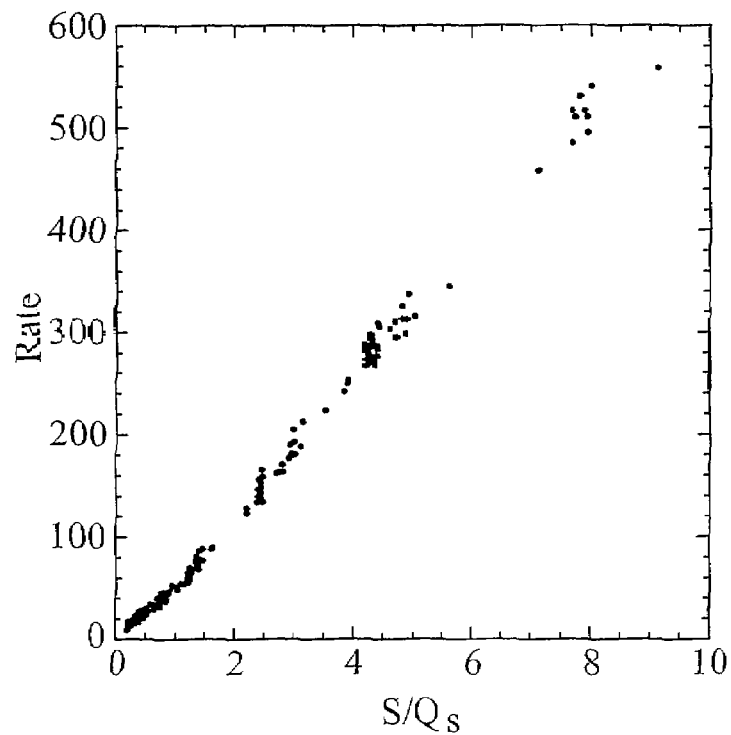
Figure 7D:
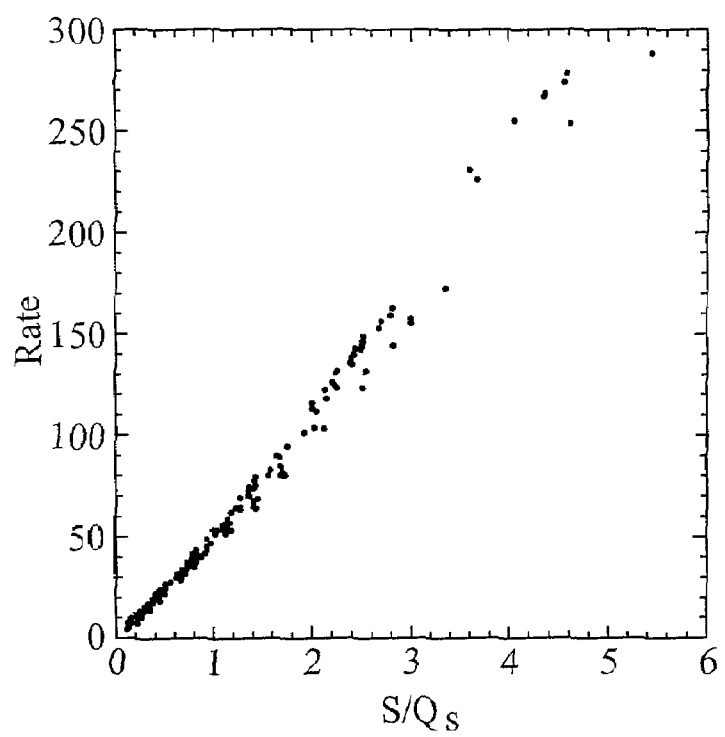
Figure 8A:
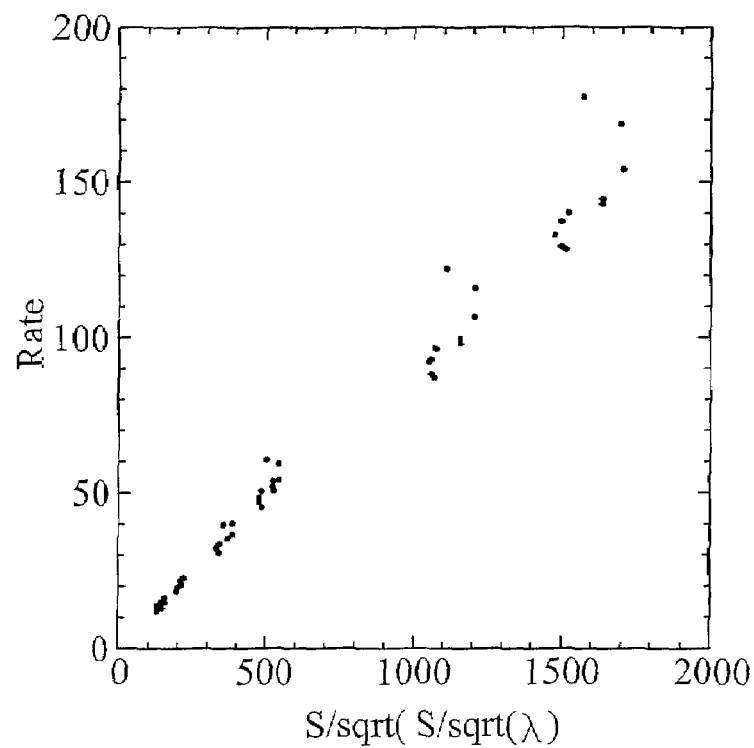
FIGS. 8a-8d plot rate $R_{GOP}$ with respect to $S/\sqrt{\lambda}$ for the QCIF "News", "Table", "Foreman", and "Mot. & Dau." sequence.
Figure 8B:
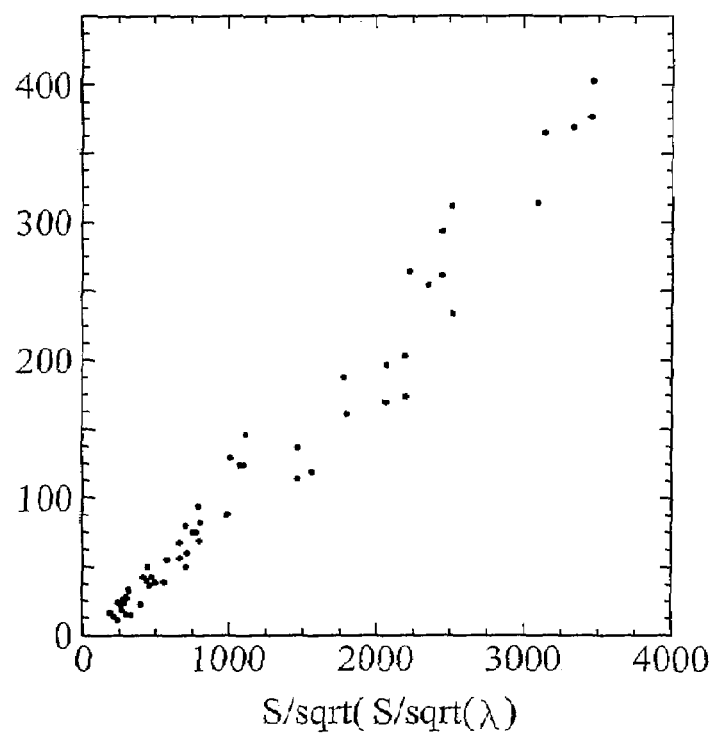
Figure 8C:
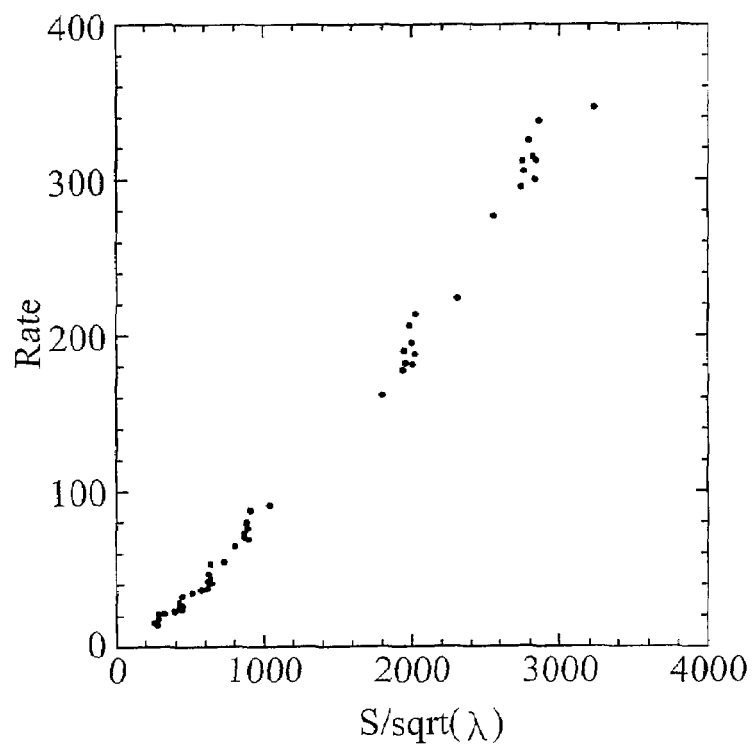
Figure 8D:
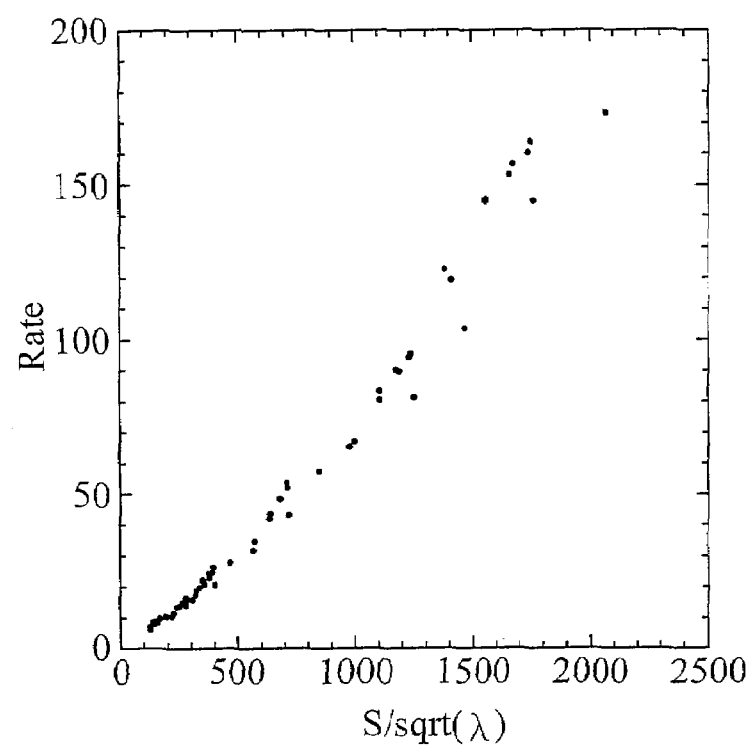

FIG. 6 is a block diagram of an exemplary encoding system with a one-pass rate controller in the invention. The video encoding system 6 comprises a frame grouping device 61, a GOP initialization device 62, a GOP encoding device 63, and a GOP-layer model updating device 64. The frame grouping device 61 is coupled to the GOP initialization device 62, the GOP encoding device 63, and subsequently to the GOP-layer model updating device 64.

In the frame grouping device 61, frames are grouped into a unit of a GOP for frame bit allocation and a target bit budget $R_{GOP}$ is allocated to the GOP. In the GOP initialization device 62, first quantization parameter $QP_1$ and Lagrange multiplier $\lambda$ for the GOP are estimated by a GOP-layer R-Q model and R-$\lambda$ model in the invention, respectively. The GOP encoding device 63 encodes the frames in the GOP, and uses the first quantization parameter $QP_1$ obtained in the GOP initialization device 62 to perform RD optimization for all frames in the GOP. Finally, model parameters of GOP-layer R-Q and R-$\lambda$ models are updated in the GOP-layer model updating device 64.

In the frame grouping device 61, target number of bits $R_{GOP}$ of the GOP is determined using the following expression:

$$R_{GOP} = \frac{C \cdot N_{GOP}}{f} \quad [10]$$

where $N_{GOP}$ is a number of frames in the GOP,
C is the channel rates in bps, and
f is the frame rates.

Comparing Equation 10 with Equation 4, a feedback term $\epsilon$ from the previous GOP is excluded in an exemplary embodiment of rate control with the one-pass bit allocation method.

First quantization parameter $QP_1$ and Lagrange multiplier $\lambda$ is determined by the GOP-layer R-Q model and R-$\lambda$ models and complexity S of the GOP, measured as follows:

$$S = \frac{1}{W \cdot H}\left(\sum_{j=1}^{W \cdot H}|f_1(j)| + \sum_{i=2}^{N_{GOP}}\sum_{j=1}^{W \cdot H}|f_i(j) - f_{i-1}(j)|\right) \quad [11]$$

where $f_i$ is the $i^{th}$ frame,
W is the width of the $i^{th}$ frame, and
H is the height of the $i^{th}$ frame.

Note that the first frame in the GOP is assumed to be an I frame and other frames are P frames. Those skilled in the art will observe that modifications and alterations of the proposed complexity measure for different GOP structures. The GOP rate $R_{GOP}$ can be estimated by the following model:

$$R_{GOP} = \eta_1 \cdot \frac{S}{Q_S} + \eta_2, \quad [12]$$

where $\eta_1$ and $\eta_2$ are model parameters,
S is the complexity of the GOP, and
$Q_S$ is the average quantization stepsize of the GOP.

FIGS. 7a-7d plot the target GOP rate $R_{GOP}$ with respect to $S/Q_S$ for the QCIF "News", "Table", "Foreman", and "Mot. & Dau." sequences. For these plots, quantization parameters QP between 15 and 40 are used as first quantization parameter $QP_1$, and several values of $\lambda$ in {0.000005, 0.00005, 0.0001, 0.0005, 0.001, 0.002, 0.003, . . . , 0.02} are used for each first quantization parameter $QP_1$ to determine the optimal number of frame bits by minimizing Lagrange cost in Equation 8. Therefore each sequence is encoded many times using the various combinations of first quantization parameter $QP_1$ and Lagrange multiplier $\lambda$, and there are the corresponding GOP rate $R_{GOP}$ and average $QP_2$ for each combination. FIGS. 7a-7d show the relationship between GOP rate $R_{GOP}$ and $S/Q_S$ for all of combinations of first quantization parameter $QP_1$ and Lagrange multiplier $\lambda$. There exists a linear relationship between the GOP rate $R_{GOP}$ and $S/Q_S$. The GOP size is set to 15 and 10 GOPs are encoded. Note that the second model parameter $\eta_2$ in Equation 12 considers the number of header bits. However, as shown in FIGS. 7a-7d, $\eta_2$ is very close to 0, which means $R_{GOP}$ also can be modeled by the following linear equation with only one parameter:

$$R_{GOP} = \eta \cdot \frac{S}{Qs} \quad [13]$$

The GOP rate $R_{GOP}$ and Lagrange multiplier λ are related by the following R-λ model:

$$R_{GOP} = \tau_1 \cdot \frac{S}{\sqrt{\lambda}} + \tau_2 \quad [14]$$

where $\tau_1$ and $\tau_2$ are model parameters, and S is the complexity of the GOP.

FIGS. 8a-8d plot the GOP rate $R_{GOP}$ with respect to S/sqrt (λ) for the QCIF "News", "Table", "Foreman", and "Mot. & Dau." sequence. However, FIGS. 8a-8d do not show data from all combinations of $QP_1$ and Lagrange multiplier λ. Out of a lot of sets of ($QP_1$, λ, $R_{GOP}$, average $QP_2$), they plot when |$QP_1$−average $QP_2$|<=1. As shown in FIGS. 8a-8d, there exists a linear relationship between $R_{GOP}$ and S/sqrt(λ). Finally, FIGS. 8a-8d shows that $\tau_2$ is very close to 0. Thus the R-λ model may be expressed as:

$$R_{GOP} = \tau \cdot \frac{S}{\sqrt{\lambda}} \quad [15]$$

Figure 9:
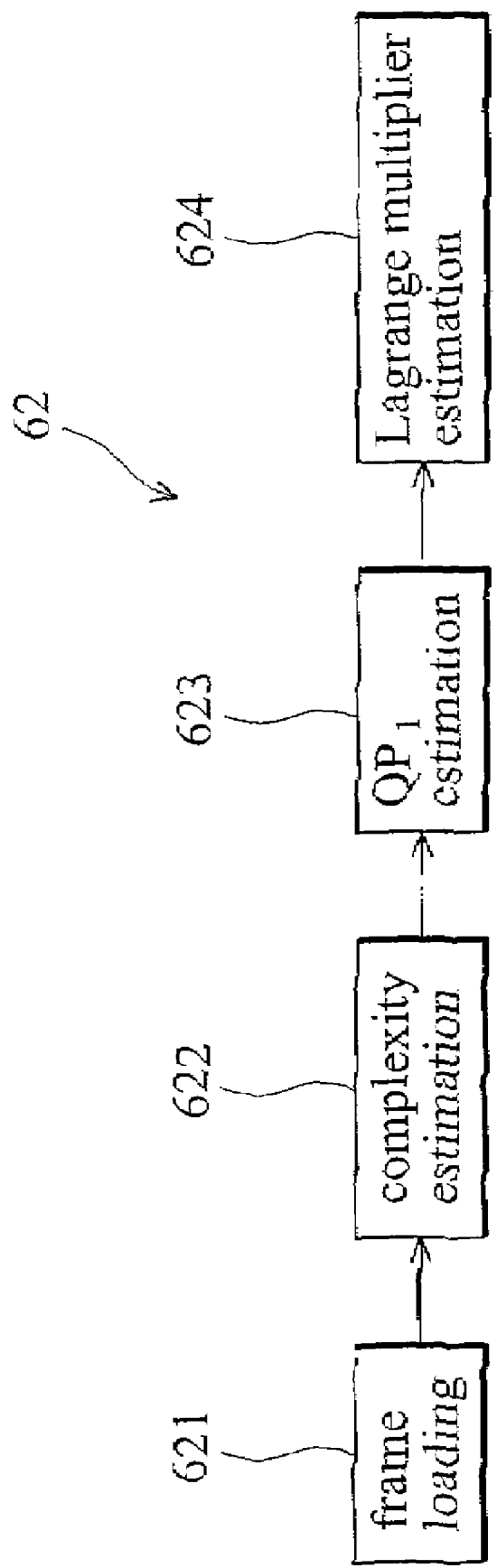
FIG. 9 is a block diagram of the GOP initialization device 62 in FIG. 6.

FIG. 9 is a block diagram of the GOP initialization device 62 in FIG. 6, comprising a frame loading unit 621, a complexity estimation unit 622, a $QP_1$ estimation unit 623 and a Lagrange multiplier estimation unit 624.

In the frame loading unit 621, all frames in the GOP are loaded in a look-ahead buffer. Complexity S of the GOP is estimated by Equation 11 in the complexity estimation unit 622. Based on the complexity S and the target bits $R_{GOP}$ of the GOP, first quantization parameter $QP_1$ is determined by either Equation 12 or Equation 13 in the $QP_1$ estimation unit 623. First quantization parameter $QP_1$ is used to perform RDO on all frames in the GOP. The Lagrange multiplier estimation unit 624 estimates Lagrange multiplier λ by either Equation 14 or Equation 15, then adjusts it according to the encoder buffer level. Lagrange multiplier λ is adjusted to a scaled Lagrange multiplier $\lambda_s$ as follows:

$$\lambda_s = s \cdot \lambda \quad [16]$$

where s is a scaling factor larger or equal to 0.

Figure 10:
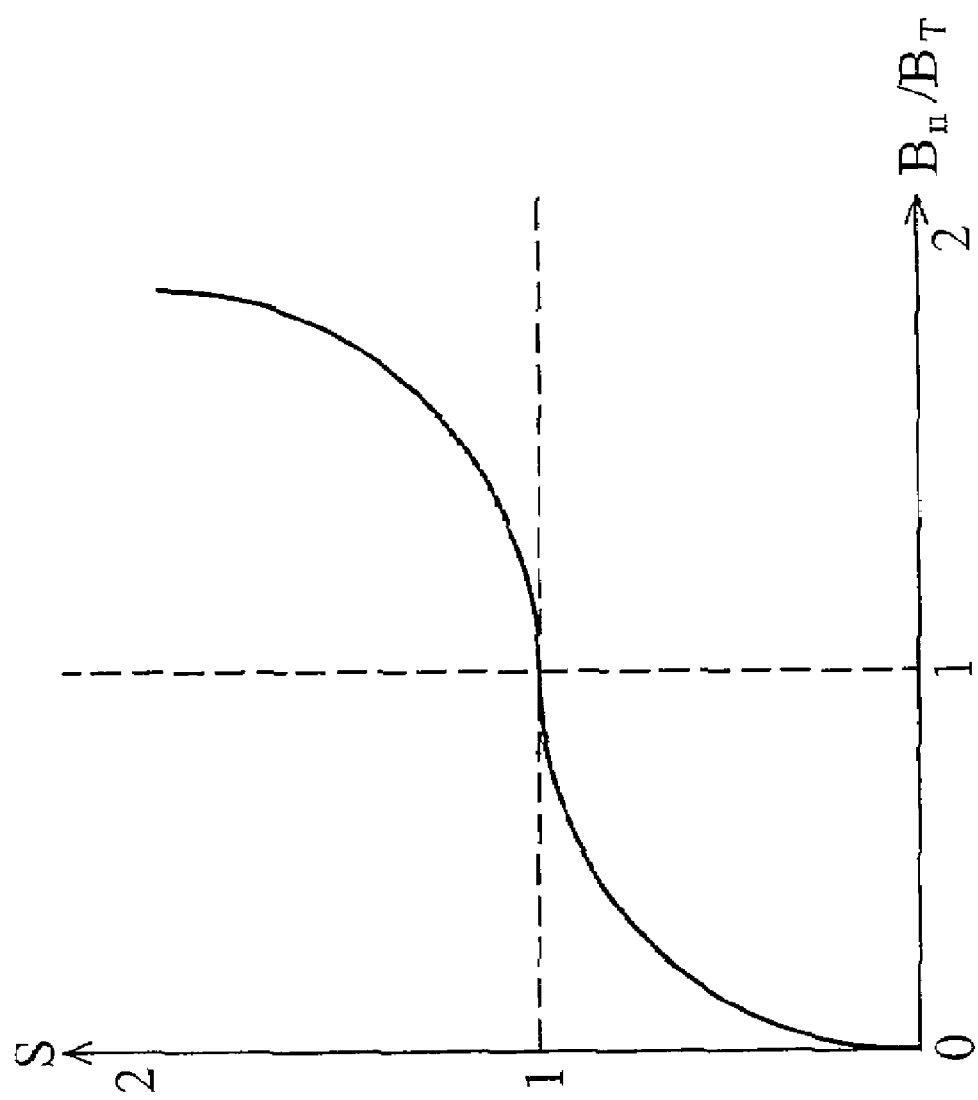
FIG. 10 shows an exemplary adjustment method of Lagrange multiplier $\lambda$ in the invention.

FIG. 10 shows an exemplary adjustment method of Lagrange multiplier λ of the invention, where $B_n$ is the encoder buffer level before encoding the GOP, and $B_T$ is a target buffer level after encoding the GOP. The scaling factor s has a value between 0 and 2. If the encoder buffer is about to underflow, the scaling factor s is close to 0. If the encoder buffer is about to overflow, the scaling factor s exceeds 1. In an embodiment, target buffer level $B_T$ is half buffer capacity of the encoder buffer. The scaling factor s is determined as follows:

$$s = \begin{cases} \left(\frac{B_n}{B_T} - 1\right)^2 + 1 & \text{if } B_n \geq B_T \\ -\left(\frac{B_n}{B_T} - 1\right)^2 + 1 & \text{otherwise} \end{cases} \quad [17]$$

Figure 11:
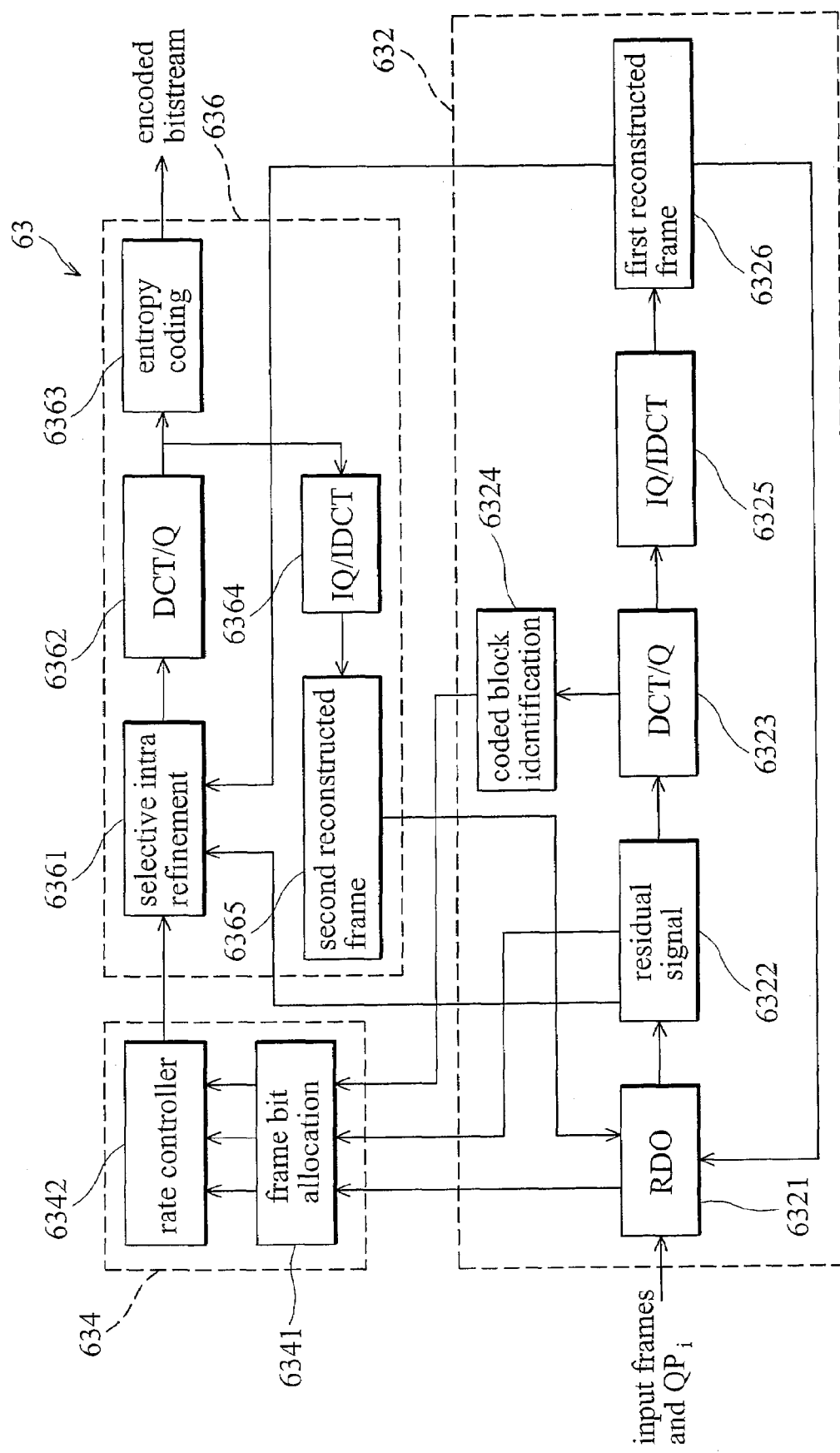
FIG. 11 is a block diagram of the GOP encoding device 63 in FIG. 6.

FIG. 11 is a block diagram of the GOP encoding device 63 in FIG. 6, encoding the $i^{th}$ frame in the GOP. The GOP encoding device 63 comprises a first-step encoding device 632, a rate control device 634 and a second-step encoding device 636.

The first-step encoding device 632 and the second-step encoding device 636 are identical to the first-step encoding device 132 and the second-step encoding device 136 in FIG. 4 respectively. The rate control device 634 is different from the rate control device 134, and comprises a frame bit allocation unit 6341 and a rate controller unit 6342.

After RDO in the first-step encoding device 632, header bits $R_{hdr}$ are estimated. After the first step of encoding, texture bits $R_{txt}(QP_i)$ and distortion $D(QP_i)$ for quantization parameter $QP_i$ from $QP_1-\Delta$ to $QP_1+\Delta$ are estimated by Equation 5 and Equation 6. Header bits $R_{hdr}$ are estimated by Equation 7 after RDO in the first-step encoding device 632. Therefore, rate $R_i(QP_i)$ and distortion $D_i(QP_i)$ for the $i^{th}$ frame can be estimated for quantization parameter $QP_i$ from $QP_i-\Delta$ to $QP_1-\Delta$. Based on rate $R_i(QP_i)$ and distortion $D_i(QP_i)$ from the first-step encoding device 632, and Lagrange multiplier λ from the GOP initializing device 62, the frame bit allocation unit 6341 determines optimal quantization parameter $QP_i'$ minimizing Lagrange cost in Equation 18, and allocates the target number of frame bit $R_T$.

$$QP_i' = \underset{QP_{avg}-\Delta \leq QP_i \leq QP_{avg}+\Delta}{\operatorname{argmin}} \omega_i \cdot D_i(QP_i) + \lambda \cdot R_i(QP_i), \quad [18]$$

where $\omega_i$ is a weighting factor
Δ is a number of steps;
$D_i(QP_i)$ is the estimated distortion at $QP_i$;
$R_i(QP_i)$ is the estimated rate at $QP_i$; and
λ is Lagrange multiplier.

The rate $R_i(QP_i')$ indicates the number of bits allocated to the $i^{th}$ frame. In an exemplary embodiment of the one-pass rate controller, the weighting factor $\omega_i$ of the first I frame is 1.2 and the weighting factor $\omega_i$'s of P frames are 1, and the number of steps Δ is 3. After the number of frame bits is allocated, the estimated number of header bits is subtracted from the number of frame bits so that the available number of texture bits can be obtained. The second-step encoding device 636 encodes the residual signal of each MB in the $i^{th}$ frame using second quantization parameter $QP_2$ determined in the rate controller unit 6342.

Figure 12:
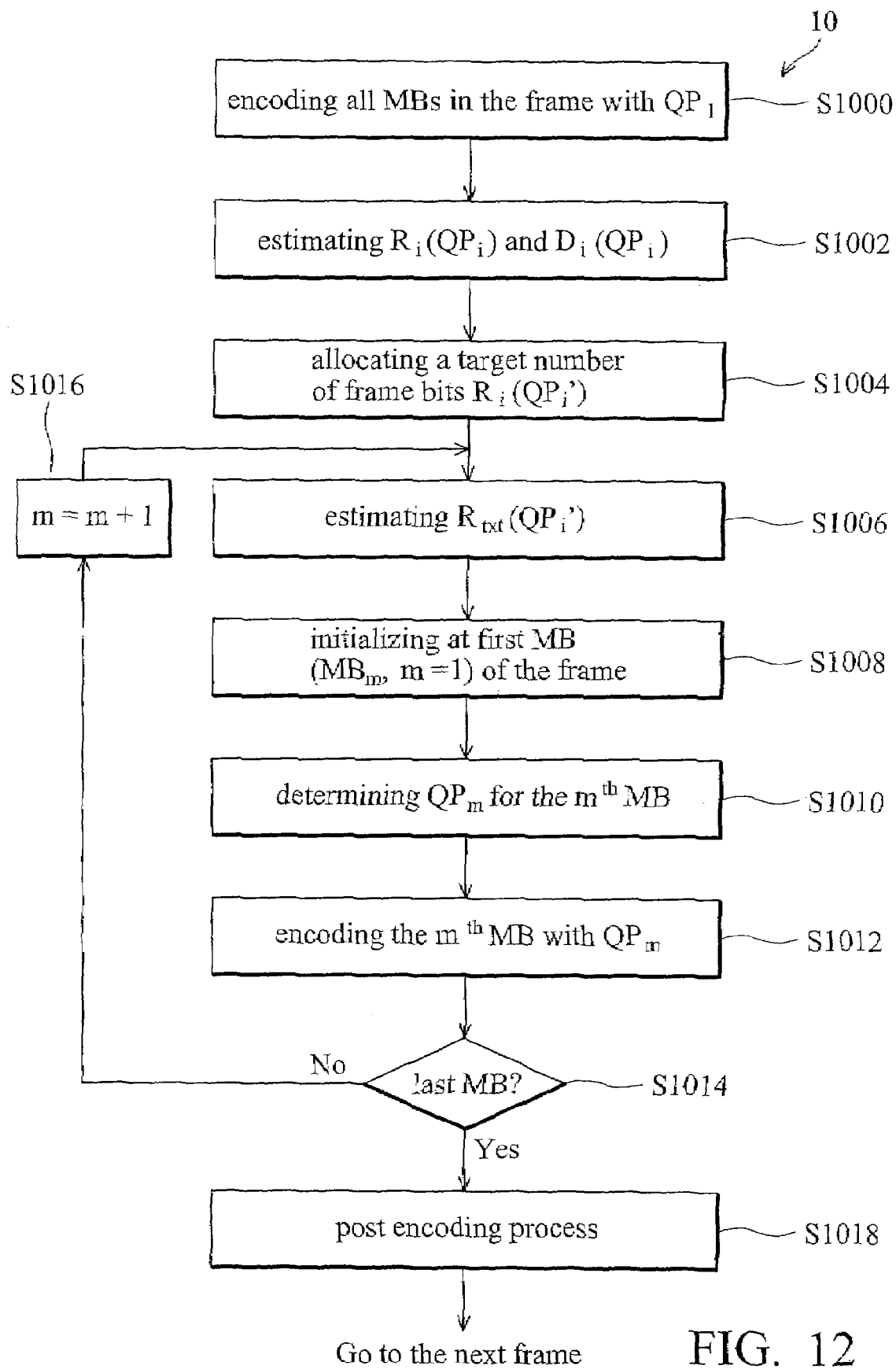
FIG. 12 is a flowchart of an exemplary one-pass frame-layer bit allocation method.

FIG. 12 is a flowchart of an exemplary one-pass frame bit allocation method, incorporating the encoding system with a one-pass rate controller in FIG. 6.

One-pass frame bit allocation method 10 is initialized by encoding the frame using first quantization parameter $QP_1$ in step S1000. Next header bits $R_{hdr}$, texture bits $R_{txt}$, and distortion D are estimated by the RDO unit 6321 in step S1002, and the frame bit allocation unit 6341 determines the target frame bits of the $i^{th}$ frame by minimizing the Lagrange cost in Equation 18 (step S1004). After frame bit allocation, the available number of texture bits is estimated in step S1006 by subtracting header bits $R_{hdr}$ from the target frame bits. In step S1008, an $m^{th}$ MB is set to a first MB of the $i^{th}$ frame, such that second quantization parameter $QP_2$ of the $m^{th}$ MB is determined in step S1010, and the $i^{th}$ MB is encoded again using second quantization parameter $QP_2$ in the step S1012. If the $m^{th}$ MB is not the last MB of the frame in the step S1014, one-pass frame bit allocation method 10 sets the $m^{th}$ MB to the next MB in the step S1016, and undergoes steps S1006 to S1014 for the $(i+1)^{th}$ frame. Otherwise, the model parameters of header rate model $R_{hdr}$, rate model $R_i(QP_i)$ and distortion model $D_i(QP_i)$ for the $(i+1)^{th}$ frame are updated using the least square approximation (LSA) technique and the encoder buffer status is updated in step S1018.

In the GOP-layer model updating device 64, after encoding all of frames in the GOP, the model parameters of GOP-layer R-Q and R-λ models are updated using LSA. In an exemplary embodiment of rate control with the one-pass bit allocation method, these model parameters are not available for the first GOP. Therefore the first GOP is encoded by the encoding system with a two-pass rate controller in FIG. 1.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of rate control with bit allocation to each frame in a current frame set, comprising:
    allocating a target number of bits to the current frame set;
    analyzing a frame in the current frame set by encoding with an average quantization parameter $QP_{avg}$ of a previous frame set to obtain a rate model and a distortion model of the frame;
    determining a first quantization parameter of the frame based on the target number of bits, the rate model and the distortion model using Lagrange optimization algorithm; and
    encoding the frame with the first quantization parameter to generate output data;
    wherein the allocating step comprises allocating the target number of bits $R_{GOP}$ based on the following expression:

$$R_{GOP} = \frac{C \cdot N_{GOP}}{f} + \varepsilon,$$

where $N_{GOP}$ is a total number of all frames in the current frame set;
C is a channel rate;
f is a frame rate; and
$\varepsilon$ is a feedback term from the previous frame set.

2. The method of claim 1, wherein the determining step comprises:
    estimating a Lagrange multiplier based on the rate model, the distortion model, and the target number of bits;
    calculating rates and distortions of the $i^{th}$ frame corresponding to sample quantization parameters $QP_i$ from $QP_{avg}-\Delta'$ to $QP_{avg}+\Delta$ based on the rate model $R_i(QP_i)$ and the distortion model $D_i(QP_i)$; and
    determining the first quantization parameter in the sample quantization parameters $QP_i$ based on the Lagrange multiplier, the rates and the distortions corresponding to the sample quantization parameters $QP_i$; and
    wherein $\Delta$ is a number of quantization step of the sample quantization parameters $QP_i$.

3. The method of claim 1, wherein the determining step comprises determining the first quantization parameter $QP_i'$ (for the $i^{th}$ frame) of the frame satisfying the following equations:

$$(QP_1', QP_2', \dots, QP_{N_{GOP}}') = \underset{QP_{avg}-\Delta' \leq QP_i \leq QP_{avg}+\Delta'}{\operatorname{argmin}} \sum_{i=1}^{N_{GOP}} \omega_i \cdot D_i(QP_i) + \lambda \cdot \sum_{i=1}^{N_{GOP}} R_i(QP_i); \text{ and}$$

$$R_{GOP} = \sum_{i=1}^{N_{GOP}} R_i(QP_i'),$$

where $N_{GOP}$ is a total number of all frames in the current frame set;
$\omega_i$ is a weighting factor of the frame;
$\Delta$ is a number of quantization step of the sample quantization parameters $QP_i$;
$D_i(QP_i)$ is the estimated distortion at $QP_i$;
$R_i(QP_i)$ is the estimated rate at $QP_i$;
$\lambda$ is a Lagrange multiplier; and
$R_{GOP}$ is the target number of bits.

4. The method of claim 3, wherein the weighting factor $\omega_i$ of an intra-frame of the current frame set exceeds that of a prediction-frame of the current frame set.

5. The method of claim 1, wherein the rate model $R_i(QP_i)$ comprises texture bits $R_{txt}(Qs)$ and header bits $R_{hdr}$ expressed as follows:

$$R_{txt}(Qs) = \alpha \cdot \frac{SATD_C(Qs)}{Qs}; \text{ and}$$

$$R_{hdr} = R_{hdr,inter} + R_{hdr,intra}$$
$$= \gamma \cdot (N_{nzMVe} + w \cdot N_{MV}) + N_{intra} \cdot b_{intra}; \text{ and}$$

the distortion model $D_i(Qs)$ comprises:

$$Di(Qs) = D_c(Qs) + D_s(Qs) = \beta \cdot SATD_c(Qs) \cdot Qs + D_s(Qs)$$

where Qs is a quantization step size corresponding to sample quantization parameters $QP_i$;
$\alpha$, $\beta$, and $\gamma$ are model parameters
$N_{intra}$ is a number of intra macroblocks (MB) in the frame;
$b_{intra}$ is an average number of header bits of the intra MB; and
w is a header weighting factor based on the number of reference frame.

6. The method of claim 1, wherein the encoding the frame with a second quantization parameter comprises:
    encoding macroblocks (MB) in the frame with the first quantization parameter $QP_i'$ to produce residual signals and header information;
    determining an MB quantization parameter $QP_2$ based on the residual signals, the header information, the rate model, and the distortion model using Lagrange optimization algorithm; and
    encoding the residual signal with the MB quantization parameter $QP_2$ to generate the output data.

7. A method of rate control for each frame of a current frame set in a video encoder, comprising:
    allocating a target bit budget $R_{GOP}$ to the current frame set;
    estimating a first quantization parameter $QP_1$ based on the target bit budget and complexity of the current frame set; and
    encoding a frame in the current frame set with the first quantization parameter to generate output data; and
    wherein the estimating step comprises estimating the first quantization parameter $QP_1$ based on the following:

$$R_{GOP} = \eta \cdot \frac{S}{Qs};$$

where $R_{GOP}$ is the target bit budget;
S is the complexity of the current frame set;
$\eta$ is a model parameter of the first quantization parameter; and
Qs is the average quantization stepsize of the current frame set.

8. The method of claim 7, wherein the estimating step comprises estimating the first quantization parameter $QP_1$ based on the following:

$$R_{GOP} = \eta_1 \cdot \frac{S}{Qs} + \eta_2;$$

where $R_{GOP}$ is the target bit budget;
S is the complexity of the current frame set; and
$\eta_1, \eta_2$ are model parameters.

9. The method of claim 7, further comprising calculating the complexity S by the following expression:

$$S = \frac{1}{W \cdot H}\left(\sum_{j=1}^{W \cdot H}|f_1(j)| + \sum_{i=2}^{N_{GOP}}\sum_{j=1}^{W \cdot H}|f_i(j) - f_{i-1}(j)|\right);$$

where $N_{GOP}$ is a total number of all frames in the current frame set;
W is a width of the frame; and
H is a height of the frame.

10. The method of claim 7, further comprising determining a Lagrange multiplier $\lambda$ based on the target bit budget $R_{GOP}$ and the complexity of the current frame set.

11. The method of claim 10, wherein the determining step comprises determining the Lagrange multiplier $\lambda$ based on the following:

$$R_{GOP} = \tau_1 \cdot \frac{S}{\sqrt{\lambda}} + \tau_2;$$

where $R_{GOP}$ is the target bit budget;
S is the complexity of the current frame set; and
$\tau_1, \tau_2$ are model parameters.

12. The method of claim 10, wherein the determining step comprises determining the Lagrange multiplier $\lambda$ based on the following:

$$R_{GOP} = \tau \cdot \frac{S}{\sqrt{\lambda}};$$

where $R_{GOP}$ is the target bit budget;
S is the complexity of the current frame set; and
$\tau$ is a model parameter.

13. The method of claim 10, further comprising scaling the Lagrange multiplier $\lambda$ by a scaling factor s based on the encoder buffer level in the video encoder.

14. The method of claim 13, further comprising computing the scaling factor s by the following relationship:

$$s = \begin{cases} \left(\frac{B_n}{B_T} - 1\right)^2 + 1 & \text{if } B_n \geq B_T \\ -\left(\frac{B_n}{B_T} - 1\right)^2 + 1 & \text{otherwise} \end{cases};$$

where $B_n$ is an initial buffer level of the encoder buffer before the encoding step; and
$B_T$ is a target buffer level of the encoder buffer after the encoding step.

15. The method of claim 10, further comprising updating the model parameters of the first quantization parameter and the Lagrange multiplier using the least square approximation (LSA) technique.

16. The method of claim 10, wherein the encoding step comprises:
encoding macroblocks (MB) in the frame with the first quantization parameter $QP_1$ to produce a rate model, a distortion model, residual signal, and header bits;
calculating rates and distortions of the frame corresponding to sample quantization parameters $QP_i$ from $QP_1-\Delta'$ to $QP_1+\Delta$ based on the rate model $R_i(QP_i)$ and the distortion model $D_i(QP_i)$;
using Lagrange optimization algorithm to determine a quantization parameter $QP_i'$ among the sample quantization parameters $QP_i$ based on the Lagrange multiplier $\lambda$, the rates and the distortions corresponding to the sample quantization parameters $QP_i$, and obtain an optimal number of bits $R_i(QP_i')$;
subtracting the header bits from the optimal number of bits $R_i(QP_i')$ to estimate texture bits;
determining a MB quantization parameter $QP_2$ based on the texture bits, the rate model, and the distortion model;
encoding the residual signal with the MB quantization parameter $QP_2$ to generate the output data; and
wherein $\Delta$ is a number of quantization step of the sample quantization parameters $QP_i$.

17. The method of claim 16, wherein the using step comprises determining the quantization parameter $QP_i'$ for the frame ($i^{th}$ frame) of the current frame set satisfying the following relationship:

$$QP_i' = \underset{QP_{avg}-\Delta \leq QP_i \leq QP_{avg}+\Delta}{\operatorname{argmin}} \omega_i \cdot D_i(QP_i) + \lambda \cdot R_i(QP_i),$$

where $\omega_i$ is a weighting factor of the frame;
$\Delta$ is a number of steps;
$D_i(QP_i)$ is the estimated distortion at $QP_i$;
$R_i(QP_i)$ is the estimated rate at $QP_i$; and
$\lambda$ is the Lagrange multiplier.

18. A video encoder, controlling rate of each frame in a current frame set (Group of Picture, GOP), comprising:
a frame grouping device, allocating a target bit budget $R_{GOP}$ to the current frame set;
a GOP initialization device coupled to the frame grouping device, estimating a first quantization parameter $QP_1$ based on the target bit budget $R_{GOP}$ and complexity of the current frame set; and
a GOP encoding device coupled to the GOP initialization device, encoding a frame in the current frame set with the first quantization parameter to generate output data; and
wherein the GOP initialization device estimates the first quantization parameter $QP_1$ based on the following $$R_{GOP} = \eta \cdot \frac{S}{Qs};$$

where $R_{GOP}$ is the target bit budget;
S is the complexity of the current frame set;
$\eta$ is a model parameter; and
Qs is the average quantization stepsize of the current frame set.

19. The video encoder of claim 18, wherein the GOP initialization device estimates the first quantization parameter $QP_1$ based on the following:

$$R_{GOP} = \eta_1 \cdot \frac{S}{Qs} + \eta_2;$$

where $R_{GOP}$ is the target bit budget;
S is the complexity of the current frame set; and
$\eta_1, \eta_2$ are model parameters.

20. The video encoder of claim 18, wherein the GOP initialization device further calculates the complexity S by the following expression:

$$S = \frac{1}{W \cdot H}\left(\sum_{j=1}^{W \cdot H}|f_1(j)| + \sum_{i=2}^{N_{GOP}}\sum_{j=1}^{W \cdot H}|f_i(j) - f_{i-1}(j)|\right);$$

where $N_{GOP}$ is a total number of all frames in the current frame set;
W is a width of the frame; and
H is a height of the frame.

21. The video encoder of claim 18, wherein the GOP initialization device further determines a Lagrange multiplier $\lambda$ based on the target bit budget $R_{GOP}$ and the complexity of the current frame set.

22. The video encoder of claim 21, wherein the GOP initialization device determines the Lagrange multiplier $\lambda$ based on the following:

$$R_{GOP} = \tau_1 \cdot \frac{S}{\sqrt{\lambda}} + \tau_2;$$

where $R_{GOP}$ is the target bit budget;
S is the complexity of the current frame set; and
$\tau_1, \tau_2$ are a model parameters.

23. The video encoder of claim 21, wherein the GOP initialization device determines the Lagrange multiplier $\lambda$ based on the following:

$$R_{GOP} = \tau \cdot \frac{S}{\sqrt{\lambda}};$$

where $R_{GOP}$ is the target bit budget;
S is the complexity of the current frame set; and
$\tau$ is a model parameter.

24. The video encoder of claim 21, wherein the GOP initialization device further scales the Lagrange multiplier $\lambda$ by a scaling factor s based on the encoder buffer level in the video encoder.

25. The video encoder of claim 24, wherein the GOP initialization device further computes the scaling factor s by the following:

$$s = \begin{cases} \left(\frac{B_n}{B_T} - 1\right)^2 + 1 & \text{if } B_n \geq B_T \\ -\left(\frac{B_n}{B_T} - 1\right)^2 + 1 & \text{otherwise} \end{cases};$$

where $B_n$ is an initial buffer level of the encoder buffer before the encoding step; and
$B_T$ is a target buffer level of the encoder buffer after the encoding step.

26. The video encoder of claim 21, further comprising a GOP model updating unit coupled to the GOP encoding device, updating the model parameters of the first quantization parameter and the Lagrange multiplier using the least square approximation (LSA) technique.

27. The video encoder of claim 21, wherein the GOP encoding device:
encodes macroblocks (MB) in the frame with the first quantization parameter $QP_1$ to produce a rate model, a distortion model, residual signal, and header bits;
calculates rates and distortions of the frame corresponding to sample quantization parameters $QP_i$ from $QP_1-\Delta'$ to $QP_1+\Delta$ based on the rate model $R_i(QP_i)$ and the distortion model $D_i(QP_i)$;
uses Lagrange optimization algorithm to determine a quantization parameter $QP_i'$ among the sample quantization parameters $QP_i$ based on the Lagrange multiplier $\lambda$, the rates and the distortions corresponding to the sample quantization parameters $QP_i$, and obtain an optimal number of bits $R_i(QP_i')$;
subtracts the header bits from the optimal number of bits $R_i(QP_i')$ to estimate texture bits;
determines a MB quantization parameter $QP_2$ based on the texture bits, the rate model, and the distortion model;
encodes the residual signal with the MB quantization parameter $QP_2$ to generate the output data; and
wherein $\Delta$ is a number of quantization step of the sample quantization parameters $QP_i$.

28. The video encoder of claim 27, wherein the GOP encoding device determines the quantization parameter $QP_i'$ for the frame ($i^{th}$ frame) of the current frame set satisfying the following relationship:

$$QP_i' = \underset{QP_{avg}-\Delta \leq QP_i \leq QP_{avg}+\Delta}{\operatorname{argmin}} \omega_i \cdot D_i(QP_i) + \lambda \cdot R_i(QP_i),$$

where $\omega_i$ is a weighting factor of the frame;
$\Delta$ is a number of steps;
$D_i(QP_i)$ is the estimated distortion at $QP_i$;
$R_i(QP_i)$ is the estimated rate at $QP_i$; and
$\lambda$ is the Lagrange multiplier.

* * * * *